No. 654,092. Patented July 17, 1900.
J. W. EISENHUTH.
WHEEL.
(Application filed Jan. 9, 1900.)

(No Model.) 2 Sheets—Sheet 1.

Witnesses
E. V. Byng
Edgar M. Kitchin

Inventor
John W. Eisenhuth
by
his Attorneys

THE NORRIS PETERS CO., PHOTO-LITHO., WASHINGTON, D. C.

No. 654,092.
J. W. EISENHUTH.
WHEEL.
(Application filed Jan. 9, 1900.)
Patented July 17, 1900.
(No Model.)
2 Sheets—Sheet 2.
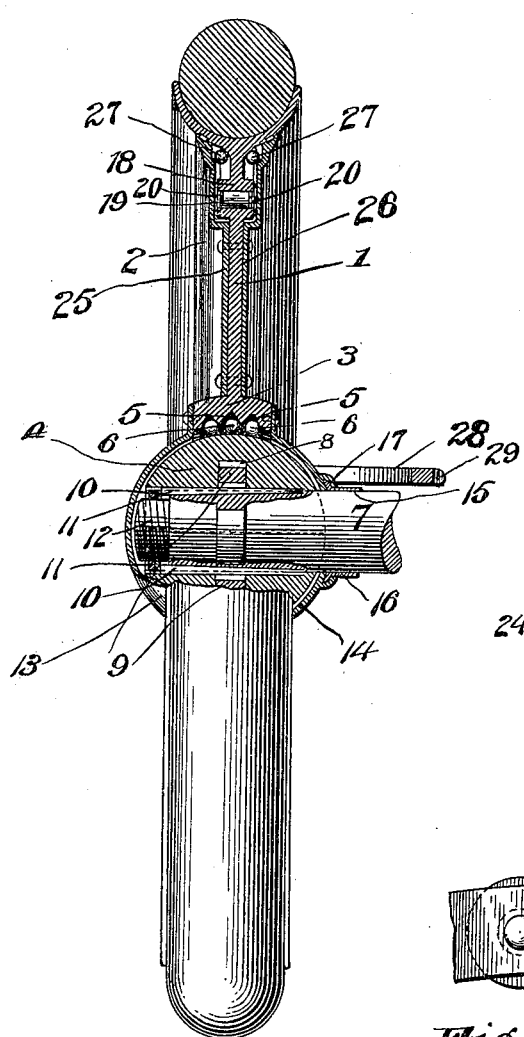
Fig. 2.
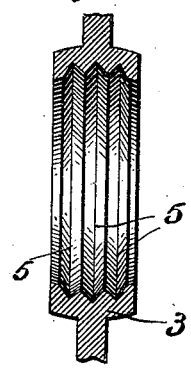
Fig. 3.
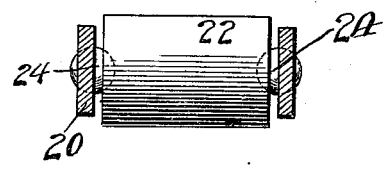
Fig. 4.
Fig. 5.
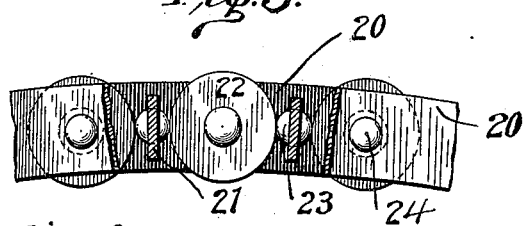
Fig. 6.
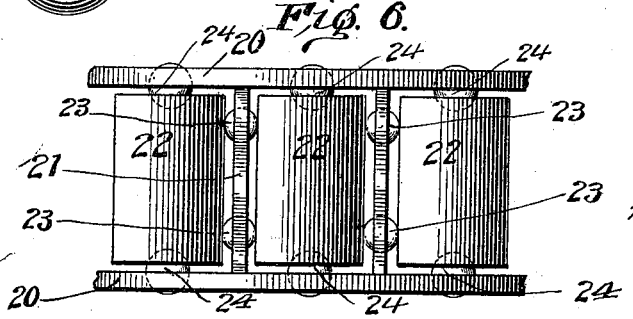

UNITED STATES PATENT OFFICE.

JOHN W. EISENHUTH, OF NEW YORK, N. Y., ASSIGNOR, BY MESNE ASSIGNMENTS, TO MAMIE G. READ, OF SAME PLACE.

WHEEL.

SPECIFICATION forming part of Letters Patent No. 654,092, dated July 17, 1900.

Application filed January 9, 1900. Serial No. 853. (No model.)

*To all whom it may concern:*

Be it known that I, JOHN W. EISENHUTH, a citizen of the United States, residing at New York city, in the county of New York and State of New York, have invented certain new and useful Improvements in Wheels; and I do hereby declare the following to be a full, clear, and exact description of the invention, such as will enable others skilled in the art to which it appertains to make and use the same.

My invention relates to improvements in wheels for vehicles, and more particularly to wheels which are adapted for use upon motor-vehicles.

The present invention has for its object the construction of wheels which are suitable for guiding a motor-vehicle; and it consists in a non-revoluble web portion, a revoluble rim portion, a central bearing, and a spherical journal for engaging the said bearing, whereby the wheel may be turned to guide the motion of the vehicle.

It also consists in certain other novel constructions, combinations, and arrangements of parts, as will be hereinafter more fully described and claimed.

Figure 1:
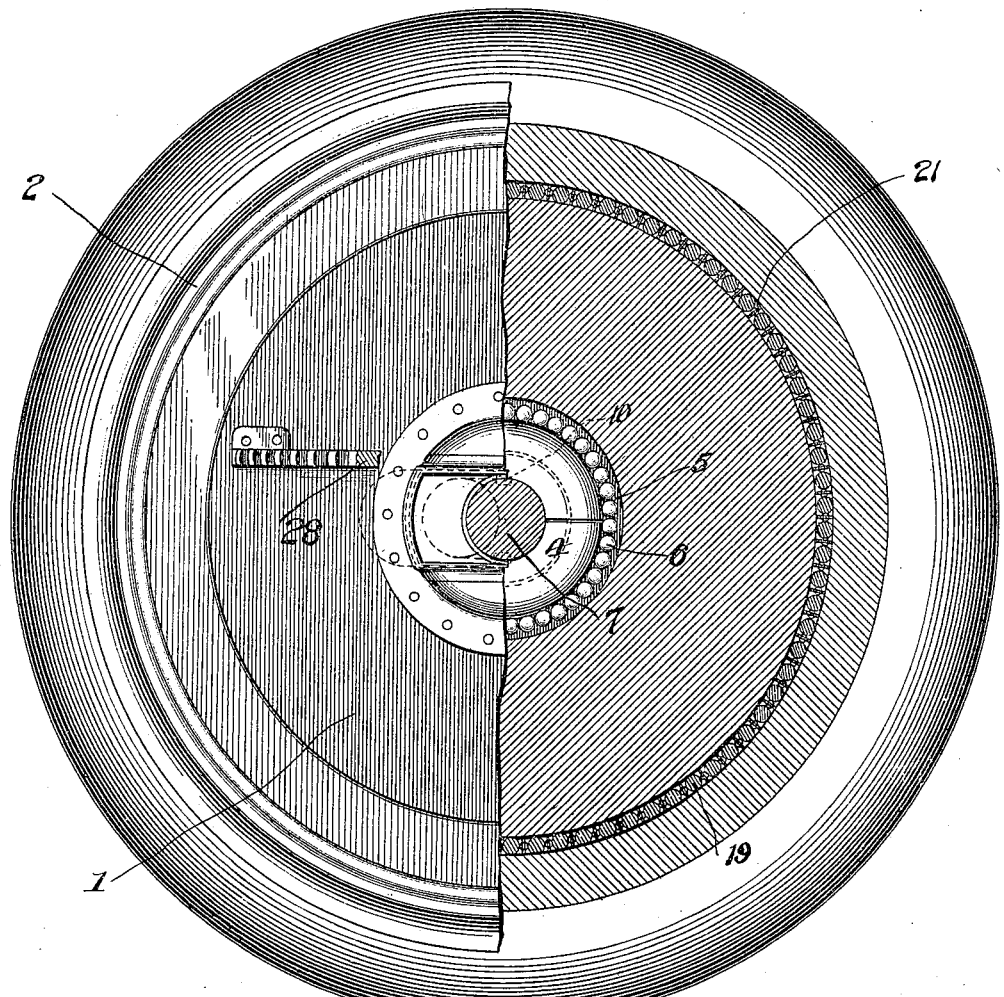
Figure 7:
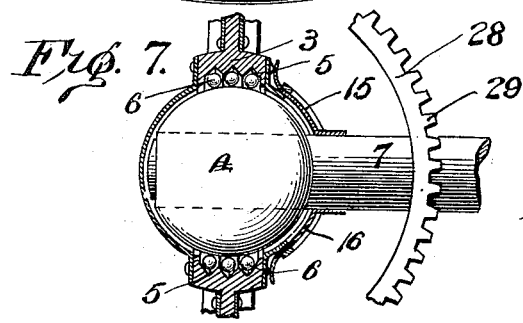

In the accompanying drawings, Figure 1 represents a side elevation of a wheel constructed in accordance with my invention, a part of the said wheel being also shown in section. Fig. 2 is a view, partially in elevation and partially in vertical cross-section, of the said wheel. Fig. 3 is a detail sectional view of the central bearing of the said wheel. Fig. 4 is a detail cross-section through a portion of an antifriction-bearing mounted in the said wheel. Fig. 5 represents a detail side elevation of a portion of the same, a part being shown in section. Fig. 6 represents a detail top plan view of a portion of the said antifriction-bearing, and Fig. 7 represents a detail horizontal sectional view of the central portion of the wheel.

In the drawings, 1 represents a non-revoluble web portion of a wheel; 2, a revoluble rim portion; 3, a central bearing, and 4 a spherical journal.

In supplying wheels for motor-vehicles I find that it is well to so construct them that they may be thoroughly braced with respect to the frame of the vehicle, and thus afford a rigid support to the vehicle. I find also that wheels which are provided with central non-revoluble web portions and revoluble rim portions are particularly well adapted for this purpose. My present invention is particularly adapted for so constructing the wheels of this character that they may be used for guiding the vehicle. In carrying out the features of my invention I form a central web portion 1 of the wheel with a central bearing, as 3. The bearing 3 is preferably provided with one or more grooves, as 5, for receiving antifriction-bolts, as 6 6, so that the wheel may be moved upon its journal without any material friction. As shown in the drawings, a good way to form the bearing is to provide it with three bearing-grooves, as 5, forming as many ball-runs therein. The bearing thus formed is adapted to engage the surface of a spherical journal 4, which is preferably rigidly secured to an axle 7 of a motor-vehicle. The spherical bearing 4 is preferably formed in two parts, so that the parts may be separated to take up any wear in the bearings. The spherical journal is provided with an internal annular groove, as 8, adapted to engage an annular flange or rib 9, formed upon the axle 7. The axle 7 and the halves of the spherical journal are provided with coinciding grooves to receive keys, as 10 10. These keys not only prevent the journal from moving upon the axle 7, but by being driven in to a greater or less extent may be used to force apart the bars of the journal, and thereby take up any wear occurring in the journal-bearings. The keys 10 10 are held in position by means of lock-nuts, as 11 11, which engage a reduced screw-threaded portion 12, formed upon the end of the axle 7. By this construction the web portion of the wheel may be turned with respect to the axle 7 for guiding the vehicle. It is preferable to inclose these parts, so as to exclude the dust and other foreign substances, and I therefore place horizontal inclosing plates, as 13 14, upon each side of the hub of the wheel. The plate 14 is provided with an elongated slot, as 15, to accommodate the axle 7 and to permit the wheel to be turned with respect to the said axle. In order to exclude dust from this opening, I secure a slide 16 to the axle 7, the said slide moving in guideways 17, formed upon the outer surface of the covering-plate 14. This slide 16 is preferably made of thin flexible material—as, for instance, thin flexible steel—so that when the wheel is turned to a considerable extent the ends of the said slide 16 projecting beyond the guide-grooves 17 may be bent to one side upon engaging the surface of the wheel.

The web portion of the wheel 1 is preferably formed of a central plate which carries the hub and bearing 3 and is provided upon its outer periphery with a widened bearing portion 17. The rim of the wheel 2 is provided with an inner annular widened bearing portion 18. Roller-bearings, as 19, are interposed between the bearing portions 17 and 18. This bearing forms an important feature of my invention and consists of side rings, as 20 20, cross connecting-bars 21 21, and antifriction-rollers 22 22, arranged in the spaces formed by the said rings and bars. In order to properly space the rollers 22 22 from each other and from the rings, I mount in the cross-bars 21 antifriction-balls, as 23 23, which project upon each side of the said bars sufficiently far to engage the peripheries of the rollers 22. Similar antifriction-balls, as 24, are mounted in the rings 20 20 and engage sockets formed in the ends of the rollers. It will thus be seen that the rollers 22 are entirely surrounded with antifriction-surfaces, so that they will work smoothly and without friction. This ring of roller-bearings and the surfaces engaging the same are preferably inclosed by the side plates 25 and 26, screwed to the opposite face of the central web 1. These plates are flared at their peripheries to form an annular recess for receiving the bearing-surfaces 17 and 18 and the roller-bearings 19. The peripheral edges of the plates 25 and 26 form a close joint with the rim 2 of the wheel, so as to exclude dust and foreign substances. Ball-bearings are preferably inserted between the said plates and the rim 2, as at 27 27, to prevent any friction at this point.

It will be observed that in a wheel of this character the rim is the only portion that revolves, the web portion 1 being held stationary, and it will also be observed that the web portion may be moved upon the spherical journal in order to give the wheel different positions. In order to move the said web portion, I preferably secure a yoke, as 28, to the same by rivets or bolts, thus securing them rigidly together. The yoke 28 may be provided with rack-teeth, as 29, if desired, so that it may engage an actuating-gearing of a suitable character.

From the above description it will be seen that I am enabled to produce a wheel of superior character for guiding motor-vehicles and one which may be strongly braced with respect to the frame of the running-gear and yet can be easily turned for directing the said running-gear in its movements.

Having now described my invention, what I claim as new, and desire to secure by Letters Patent, is—

1. A guiding-wheel for vehicles comprising a non-revoluble web portion, a revoluble rim portion, a central hub-bearing, a spherical journal for engaging the said bearing, and means for turning the said web portion upon the said bearing, substantially as described.

2. A guiding-wheel for vehicles comprising a revoluble rim portion, a non-revoluble web portion, a central bearing portion, a spherical journal engaging the said bearing, antifriction means interposed between the hub and spherical bearings, and a means for turning the web portion upon the said bearing for directing the wheel, substantially as described.

3. A guiding-wheel for vehicles comprising a rim and web portion, a central bearing having a series of grooves forming ball-races, a spherical journal engaging the said bearing, balls mounted in the said races for reducing friction between the parts, and a means for turning the said wheel upon the said journal, substantially as described.

4. A journal-bearing for guiding-wheels comprising a central hub-bearing on the wheel, a spherical journal secured to the axle of a running-gear, the said spherical journal being divided, and a means for securing the divided journal upon the end of an axle, substantially as described.

5. A journal-bearing for guiding-wheels comprising a hub-bearing formed on the wheel, a spherical divided journal on the axle of a vehicle, the said spherical journal being provided with an internally-arranged annular groove adapted to engage an annular flange upon the shaft of the running-gear, keys interposed between the spherical journal and the axle whereby the parts of the divided journal may be separated to take up wear in the parts and means for holding the keys in place, substantially as described.

6. A journal-bearing for guiding-wheels comprising a hub-bearing on the said wheel, a spherical journal secured to the axle of a running-gear, keys interposed between the axle and the divided parts of the spherical journal, nuts on the end of the axle for holding the keys in position, dust-proof cases screwed to the hub of the wheel and inclosing the journal whereby the bearings may be entirely inclosed, the said cases having a slot for accommodating the said axle, and a flexible slide for inclosing the said slot, substantially as described.

7. A guiding-wheel for vehicles comprising a central non-revoluble web portion, a revoluble rim portion opposing, bearing-surfaces formed upon the adjacent edges of the web and rim portions, antifriction-bearings interposed between the same comprising rings, means for connecting the rings, and rollers spaced apart in the said rings, substantially as described.

8. A guiding-wheel for motor-vehicles comprising a non-revoluble web portion and a revoluble rim portion, bearing-surfaces formed upon the adjacent edges of the said web and rim, antifriction means interposed between the said bearing-surfaces comprising rings, bars connecting the said rings and forming a series of spaces between them, rollers mounted in said spaces and antifriction-balls mounted in the rings and bars, and engaging the rollers for holding them in the proper position without friction, substantially as described.

9. A guiding-wheel for vehicles comprising a non-revoluble web portion and revoluble rim portion, a journal-bearing comprising a hub-bearing and a spherical journal, and a yoke rigidly secured to the said web portion whereby the web portion may be turned upon the spherical journal to direct the wheel, substantially as described.

In testimony whereof I hereunto affix my signature in presence of two witnesses.

JOHN W. EISENHUTH.

Witnesses:
VAN BUREN LAMB,
FENTON S. BELT.